(No Model.)

W. A. CAMPBELL.
SAW MILL STOCK ROLLER.

No. 375,801. Patented Jan. 3, 1888.

Witnesses,
Geo. H. Strong.

Inventor,
W. A. Campbell
By Dewey & Co.
att'ys

N. PETERS, Photo-Lithographer, Washington, D. C.

UNITED STATES PATENT OFFICE.

WILLIAM A. CAMPBELL, OF PORTLAND, OREGON.

SAW-MILL STOCK-ROLLER.

SPECIFICATION forming part of Letters Patent No. 375,801, dated January 3, 1888.

Application filed August 13, 1887. Serial No. 246,908. (No model.)

*To all whom it may concern:*

Be it known that I, WILLIAM A. CAMPBELL, of Portland, Multnomah county, State of Oregon, have invented an Improvement in Saw-Mill Stock-Rollers; and I hereby declare the following to be a full, clear, and exact description of the same.

My invention relates to the class of saw-mill machinery, and especially to a new and useful stock-roller; and my invention consists in a roller mounted in a sliding bracket and adapted to be adjusted to position against the log, said bracket having a pawl by which it is fixed in position, and a sliding rack for engaging the pawl, and having a screw by which the rack is moved for the purpose of setting the roller to the fractional part of an inch.

The object of my invention is to provide a stock-roller which can be readily and accurately adjusted.

Figure 1:
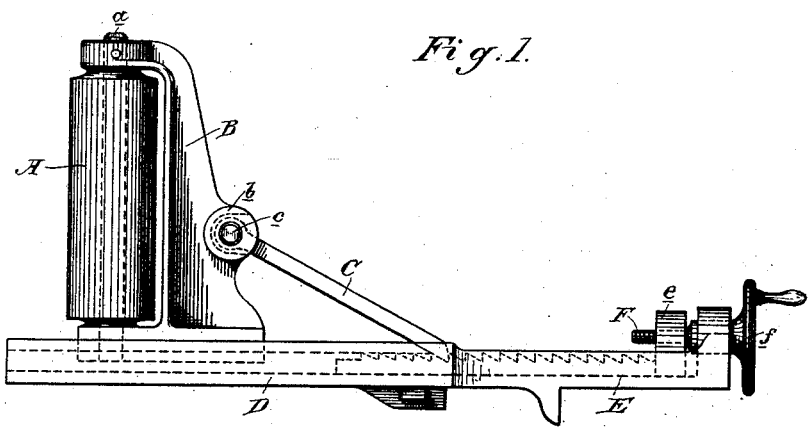
Figure 2:
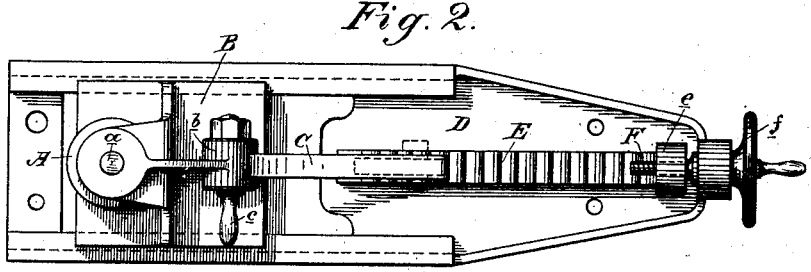
Figure 3:
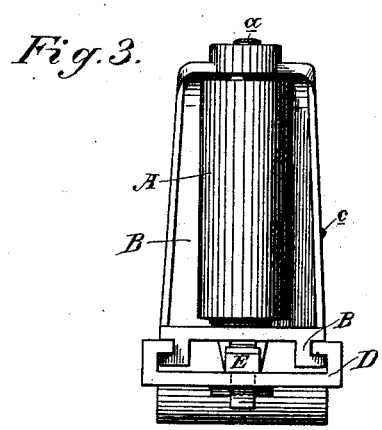

Referring to the accompanying drawings for a more complete explanation of my invention, Figure 1 is a side elevation of my adjustable stock-roller. Fig. 2 is a plan of the same. Fig. 3 is an end elevation.

A is the roller, which is made round and of any required diameter and length, said roller being mounted and working loosely on a vertical spindle, $a$, which has its bearings in a sliding bracket, B. The bracket B has a recessed lug, $b$, cast on its back supporting web, which said lug receives the hub of the pawl C. The pawl C is made of wrought iron and works freely on a pin, $c$, passing through the lug $b$, and is made long enough to carry the roller A a little over the end of the main frame D, when it engages the last notch of the rack E. The rack E is made of cast-iron, of any required length, with notches spaced any required number of inches apart. A lug, $e$, is cast on the back part of the rack and is tapped to receive a screw, F. The screw F is made of any required pitch or diameter, so as to admit of setting the roller to the fractional part of an inch by means of the hand-wheel $f$, keyed to its end.

The main frame D, which is made of cast-iron, has planed slides of suitable length, which fit planed grooves in the bracket B. The end of the rack E terminates back of the bracket B, and both bracket and rack are mounted and adapted to slide independently in the main frame D.

The operation of the mechanism is as follows: The stock-roller is set up and bolted to the main saw-husk on the side of the arbor from which the log is fed into the cut. The bracket B, carrying the roller, is then slid forward until the roller bears against the face of the log from which a slab has already been cut. When the roller rests against the face of the log, the pawl C should rest firmly in a notch of the rack E, and it can be made to do so by turning the hand-wheel $f$, actuating the screw F, which will move the said rack in the main frame D. After this adjustment is made, the roller can be moved forward to suit any required thickness of stock, inches being counted on the rack, and fractional parts of an inch being obtained by means of the screw F. To move the roller back when the log has been sawed, raise the pawl C and slide the roller back to the back of the frame D.

Having thus described my invention, what I claim as new, and desire to secure by Letters Patent, is—

1. The main frame, the bracket adapted to slide thereon, and a pawl attached to the back of the bracket, in combination with a rack mounted to slide in the main frame and engaged by said pawl, and a roller carried by the bracket and adapted to be set up and held in its adjusted position by said pawl and rack, substantially as described.

2. A saw-mill stock-roller mounted in a sliding bracket and a pawl attached to the back of the bracket, in combination with a rack sliding in the main frame, with which said pawl engages, and an independent screw engaging a lug on the end of the rack, by which said rack may be adjusted to adjust the roller to the fractional part of an inch, substantially as described.

In witness whereof I have hereunto set my hand.

WILLIAM A. CAMPBELL.

Witnesses:
G. ROSENBLATT,
J. M. ARTHUR.